United States Patent
Balfanz et al.

(10) Patent No.: US 7,552,322 B2
(45) Date of Patent: Jun. 23, 2009

(54) USING A PORTABLE SECURITY TOKEN TO FACILITATE PUBLIC KEY CERTIFICATION FOR DEVICES IN A NETWORK

(75) Inventors: Dirk Balfanz, Redwood City, CA (US); Glenn E. Durfee, San Francisco, CA (US); Diana K. Smetters, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 720 days.

(21) Appl. No.: 10/877,477

(22) Filed: Jun. 24, 2004

(65) Prior Publication Data

US 2005/0287985 A1  Dec. 29, 2005

(51) Int. Cl.
*H04L 9/00* (2006.01)
(52) U.S. Cl. .......... 713/159; 713/155; 713/156; 713/168; 726/4; 726/7; 380/25; 380/30; 380/255; 380/270
(58) Field of Classification Search .......... 713/150, 713/155–156, 159, 168, 171–172; 726/2, 726/4, 7, 9; 380/25, 30, 255, 270; 709/227; 455/410; 705/67
See application file for complete search history.

(56) References Cited

U.S. PATENT DOCUMENTS

| | | | |
|---|---|---|---|
| 5,408,250 A | 4/1995 | Bier | 345/169 |
| 5,519,778 A | 5/1996 | Leighton et al. | 380/30 |
| 5,539,824 A | 7/1996 | Bjorklund et al. | 380/21 |
| 5,781,723 A * | 7/1998 | Yee et al. | 726/20 |
| 5,784,463 A * | 7/1998 | Chen et al. | 713/171 |
| 6,064,741 A | 5/2000 | Horn et al. | 380/285 |
| 6,075,860 A | 6/2000 | Ketcham | 380/25 |

(Continued)

FOREIGN PATENT DOCUMENTS

EP  001024626 A1 *  8/2000

(Continued)

OTHER PUBLICATIONS

Balfanz, Dirk et al., "Talking To Strangers: Authentication in Ad-Hoc Wireless Networks," Xerox Palo Alto Rearch Center, Mar. 11, 2002, pp. 1-14.*

(Continued)

*Primary Examiner*—Kimyen Vu
*Assistant Examiner*—Baotran N To
(74) *Attorney, Agent, or Firm*—Park, Vaughan & Fleming LLP

(57) ABSTRACT

One embodiment of the present invention provides a system that uses a portable security token to facilitate public key certification for a target device in a network. During system operation, the portable security token is located in close physical proximity to the target device to allow the portable security token to communicate with the target device through a location-limited communication channel. During this communication, the portable security token receives an authenticator for the target device, and forms a ticket by digitally signing the authenticator with a key previously agreed upon by the portable security token and a certification authority (CA). Next, the portable security token sends the ticket to the target device, whereby the target device can subsequently present the ticket to the CA to prove that the target device is authorized to receive a credential from the CA.

30 Claims, 3 Drawing Sheets

U.S. PATENT DOCUMENTS

| | | | |
|---|---|---|---|
| 6,105,133 | A | 8/2000 | Fielder et al. ............... 713/169 |
| 6,243,373 | B1 | 6/2001 | Turock ....................... 370/352 |
| 6,243,772 | B1 | 6/2001 | Ghori et al. ................... 710/68 |
| 6,366,654 | B1 | 4/2002 | Cramer et al. ........... 379/93.09 |
| 6,601,171 | B1 | 7/2003 | Carter et al. ................ 713/175 |
| 2001/0048744 | A1 | 12/2001 | Kimura ..................... 380/247 |
| 2002/0061748 | A1 | 5/2002 | Nakakita et al. ............ 455/435 |
| 2002/0065065 | A1 | 5/2002 | Lunsford et al. ............ 455/411 |
| 2002/0094087 | A1 | 7/2002 | Dellmo et al. .............. 380/270 |
| 2002/0147920 | A1* | 10/2002 | Mauro ........................ 713/200 |
| 2002/0159598 | A1 | 10/2002 | Rubinstein et al. .......... 380/259 |
| 2003/0014646 | A1 | 1/2003 | Buddhikot et al. .......... 713/184 |
| 2003/0051140 | A1 | 3/2003 | Buddhikot et al. .......... 713/169 |
| 2003/0078072 | A1 | 4/2003 | Serceki et al. .............. 455/557 |
| 2003/0081774 | A1 | 5/2003 | Lin et al. ..................... 380/44 |
| 2003/0115468 | A1* | 6/2003 | Aull et al. ................... 713/175 |
| 2003/0117985 | A1 | 6/2003 | Fujii et al. .................. 370/338 |
| 2003/0149874 | A1 | 8/2003 | Balfanz et al. .............. 713/168 |
| 2004/0088548 | A1 | 5/2004 | Smetters et al. ............. 713/175 |
| 2004/0103280 | A1 | 5/2004 | Balfanz et al. .............. 713/169 |

FOREIGN PATENT DOCUMENTS

| | | |
|---|---|---|
| EP | 1 363 424 A2 | 11/2003 |
| WO | WO 99/41876 | 8/1999 |

OTHER PUBLICATIONS

"Secured Network Authentication Using Biometrics Application", Muhammad Hafiz b. Laili et al., Proceedings of IEEE 2002 Student Conference on Research and Development, Shah Alam, Malaysia, pp. 368-370.

U.S. Appl. No. 60/480,909, entitled "Methods and Apparatus for Establishing and Using a Secure Credential Infrastructure" to Diana K. Smetters et al., filed Jun. 24, 2003.

U.S. Appl. No. 10/231,194 entitled "Apparatus and Methods for Providing Secured Communication" to Dirk Balfanz et al., filed Aug. 30, 2002.

U.S. Appl. No. 10/424,191 entitled "System and Method for Establishing Secondary Channels" to Conley et al., filed Apr. 25, 2003.

U.S. Appl. No. 10/656,439 entitled "Method, Apparatus, and Program Product for Securely Presenting Situation Information" to Smetters et al., filed Sep. 5, 2003.

U.S. Appl. No. 10/656,551 entitled "Method, Apparatus, and Program Product for Provisioning Secure Wireless Sensors" to Smetters et al., filed Sep. 5, 2003.

"ACC: Automatic Cryptographic Configuration of Embedded Devices" XML Trust Center White Paper 19$^{th}$ Feb. 2002, http://research.verisign.com/Papers/ACC1.html.

Asokan, N. et al.: "Key agreement in ad hoc networks", Computer Communications, Elsevier Science Publishers BV, Amsterdam, NL, vol. 23, No. 17, Nov. 1, 2000, pp. 1627-1637.

Balfanz, D. et al., "Talking To Strangers: Authentication in Ad-Hoc Wireless Networks," Xerox Palo Alto Research Center, [Retrieved from the Internet at http://www.isoc.org/isoc/conferences ndss/02/proceedings/papers/balfan.pdf on Feb. 18, 2003] (Posted on the Internet on Feb. 11, 2002).

Bardram, Jakob E. et al. "Context-Aware User Authentication-Supporting Proximity-Based Login in Pervasive Computing", A.K. Dey et al. (Eds.): UbiComp 2003, LNCS 2864, pp. 107-123, 2003.

Dridi, F. et al., "How to Implement Web-Based Groupware Systems Based on WebDAV," Published in Proc. of WETICE 99, IEEE 8th Intl. Workshops on Enabling Technologies: Infrastructure for Collaborative Enterprises, Stanford, CA, pp. 1-7 (1999).

Fielding, R. et al., "Web-Based Development of Complex Information Products," Communications of the ACM, vol. 41, No. 8, pp. 84-92 (1998).

Geer, Daniel E. et al. "Token-Mediated Certification and Electronic Commerce", Proceedings of the Second USENIX Workshop on Electronic Commerce, Oakland, California, Nov. 1996.

Kindberg, Tim and Zhang, Kan "Secure Spontaneous Device Association", A.K Dey et al. (Eds.): UbiComp 2003, LNCS 2864, pp. 124-131, 2003.

Kindberg, Tim and Zhang, Kan "Validating and Securing Spontaneous Associations between Wireless Devices" HP Laboratories, Palo Alto, HPL-2002-256, Hewlett-Packard Company, Sep. 12, 2002.

Lopes, D. et al., "Aerial Acoustic Communication," IEEE Workshop on Applications of Signal Processing to Audio and Acoustics, pp. 21-24, (2001).

Schneier, Bruce: "Applied Cryptography: Protocols, Algorithms, and Source Code in C" 1996, John Wiley & Sons, New York, US, Section 8.3 "Transferring Keys".

Stajano, F. and Anderson, R.: "The Resurrecting Duckling: Security Issues for Ad-hoc Wireless Networks" 1999, AT&T Software Symposium, 'Online!' Sep. 15, 1999.

Whitehead, Jr., E. et al., "WebDAV, A Network Protocol for Remote Collaborative Authoring on the Web," pp. 1-21 (1999) [Retrieved from the Internet at http://citeseer.nj.nec.com/whitehead99webdav.html on Mar. 11, 2003].

Whitehead, Jr., E. et al., "Lessons from WebDAV for the Next Generation Web Infrastructure," Department of Information and Computer Science, University of California [Retrieved from the Internet at http://www.ics.uci.edu/~ejw/http-future/Whitehead/http_pos_paper.html on Sep. 20, 2002].

* cited by examiner

USING A PORTABLE SECURITY TOKEN TO FACILITATE PUBLIC KEY CERTIFICATION FOR DEVICES IN A NETWORK

RELATED APPLICATION

The subject matter of this application is related to the subject matter in a co-pending non-provisional application by inventors Diana K. Smetters, Dirk Balfanz, Glenn E. Durfee, Rebecca E. Grinter, Paul J. Stewart and Hao-Chi Wong, entitled, "Method, Apparatus and Program Product for Securely Presenting Situation Information," having Ser. No. 10/656,439, and filing date 5 Sep. 2003.

BACKGROUND

1. Field of the Invention

The present invention relates to mechanisms for providing security in distributed computing systems. More specifically, the present invention relates to a method and an apparatus that uses a portable security token to facilitate public key certification for devices in a network.

2. Related Art

Public key cryptography provides a powerful tool that can be used to both encrypt data and to authenticate digital signatures. However, before public key cryptography can become widely used, there must exist a practical and reliable solution to the problem of associating public keys with their owners in a trusted (authenticated) manner.

One solution to this problem is to construct a Public Key Infrastructure (PKI). A PKI supports a collection of well-known trusted public keys, which can possibly be hierarchically organized. In a PKI, the owner of a trusted key is usually referred to as a "Certification Authority," or "CA." A CA can use a private key corresponding to its trusted public key to authenticate the keys of other members (users and devices) in the PKI by signing the keys for the members, and creating a "digital certificate." A digital certificate typically links a public key to information indicating who owns the key (an identity certificate), or what the key is allowed to be used for (an attribute certificate), or at a minimum, that the bearer of the corresponding private key is a valid member of this particular PKI or other trust system. The existence of a PKI simplifies the key management problem, because it is not necessary to exchange keys for all members of a trusted network, only the trusted public keys need to be exchanged.

Unfortunately, the operations involved in creating a PKI, managing a PKI, and distributing certificates, have turned out to be extremely difficult to perform in practice. Even establishing a small special-purpose PKI to support the use of public key cryptography for one application within one organization is generally considered to be too expensive and difficult to be worthwhile. One reason for this is that existing software tools are complicated, expensive, and require extensive knowledge of standards and cryptography. As a result, in spite of the fact that the use of public key cryptography can dramatically increase the security of many communications protocols (for example, compared to password-based alternatives), protocol designers typically use less secure alternatives that do not involve the "burden" of establishing a PKI. Similarly, this cost of establishing a PKI keeps individuals from considering a larger-scale use of public key cryptography in embedded devices (such as cell phones and printers), because each of these devices would have to be "provisioned" with a digital certificate.

A derivative problem exists for wireless networks. Wireless networks are notoriously difficult to configure securely, even for a knowledgeable network administrator. Consequently, many wireless networks do not provide adequate security. These networks simply leave information and network resources exposed to strangers, thereby making machines on the network vulnerable to attack. Although standards bodies have begun to specify new technologies capable of securing wireless networks, these new technologies are complex, and even more difficult to configure and manage than existing technologies.

Hence, what is needed is a less-complicated mechanism for creating a secure credential infrastructure such as a PKI, and in particular a mechanism that is practical to use in wireless networks.

SUMMARY

One embodiment of the present invention provides a system that uses a portable security token to facilitate public key certification for a target device in a network. During system operation, the portable security token is located in close physical proximity to the target device to allow the portable security token to communicate with the target device through a location-limited communication channel. During this communication, the portable security token receives an authenticator for the target device, and forms a ticket by digitally signing the authenticator with a key previously agreed upon by the portable security token and a certification authority (CA). Next, the portable security token sends the ticket to the target device, whereby the target device can subsequently present the ticket to the CA to prove that the target device is authorized to receive a credential from the CA.

Note that in a variation on this embodiment, the target device presents to the CA information necessary to prove that the target device is the one that provided the authenticator and should receive the credential. This can be accomplished by revealing the pre-image of the hashed secret authenticator in the tunnel, or signing something with the private key whose corresponding public key the token signed in the ticket. Technically speaking, if the credential to be issued is a public one (e.g. a public key certificate) that depends on public key signatures and even if it falls into the wrong hands cannot be used by anyone other than the private key holder, the target does not actually have to "prove possession" of the private key in order for the CA to be reasonable in generating the certificate. However, if the target isn't the holder of the private key (e.g. it's someone who has just gotten hold of the ticket), in the proposed scenarios of use, they could make life difficult for the legitimate target by making it hard for the real target to actually obtain its validly issued certificate.

If the credential is one that needs to be kept private, it needs to be distributed in a tunnel, where both parties have carefully ensured that the respective ends of the tunnel are the correct players—the CA (the holder of the private key corresponding to the public key of the CA provided to the target) and the holder of the secret backing up the authenticator value (the pre-image of the secret hash or the private key).

Also note that in the case where the portable security token and the target have a $2^{nd}$ communication channel available to them, they could perform some of this communication across that $2^{nd}$ channel. If the portable security token was insufficiently powerful to perform a full exchange over two channels Oust exchange hashes of public keys over the LLC, establish an SSL or other tunnel over the $2^{nd}$ link and send the rest through that), they could exchange the authenticator value and CA key hash over the LLC, along with addressing information, and then exchange the ticket and supporting info over the $2^{nd}$ channel.

In a variation on this embodiment, the authenticator can include: a hash of the target device's public key; a hash of a secret known only by the target device; the target device's public key; or a hash of a certificate or a piece of data belonging to the device already.

In a variation on this embodiment, the key previously agreed upon by the portable security token and the CA can be: a secret symmetric key known by only the portable security token and the CA, or a private key belonging to the portable security token. (Note that the CA and the portable security token actually agree on the public key corresponding to this private key; the CA never sees the private key directly. They do implicitly agree also on the private key, though, because of the mathematical relationship between the private key and the public key.)

In a variation on this embodiment, the credential is a public key certificate for the target device, which is signed by the CA.

In a variation on this embodiment, before the portable security token communicates with the target device, the portable security token initially communicates with the CA. During this initial communication, the CA and portable security token agree upon the key which is used to sign the ticket. The CA also communicates a hash of the CA's public key and addressing information for the CA to the portable security token. (Note that they can also communicate the full public key for the CA, which the portable security token could either give to the target as is or reduce to a hash, or a full certificate or the hash thereof, etc.)

In a variation on this embodiment, prior to receiving the authenticator at the portable security token, the portable security token sends a request for the authenticator to the target device.

In a variation on this embodiment, the portable security token additionally sends the CA's public key (or a hash of the CA's public key) to the target device, thereby enabling the target device to authenticate the CA.

In a variation on this embodiment, the portable security token additionally sends addressing information for the CA to the target device, thereby enabling the target device to communicate with the CA.

In a variation on this embodiment, in addition to the authenticator, the ticket can also include: an identifier for the CA; an identifier for the portable security token; and an indicator of the purpose for the ticket.

In a variation on this embodiment, after the target device receives the ticket, the target device subsequently communicates with the CA. In doing so, the target device first authenticates the CA using the CA's public key (or the hash of the CA's public key) provided to the target device by the portable security token.

In a variation on this embodiment, after the target device authenticates the CA, the target device sends the following to the CA: the ticket; the pre-image of the authenticator (if one exists); and any other information that the CA needs to verify the ticket. (Note that if the pre-image of the authenticator is a secret known only by the target device, the pre-image is sent to the CA through a secure tunnel.)

In a variation on this embodiment, the CA subsequently attempts to authenticate the target device using the ticket, the pre-image of the authenticator (if one exists), and the key previously agreed upon by the portable security token and the CA. Next, if the target device is authenticated, the CA sends the credential to the target device.

In a variation on this embodiment, the portable security token is hardware-constrained and therefore has limited computational capabilities. Consequently, the portable security token may not be capable of performing public-key operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
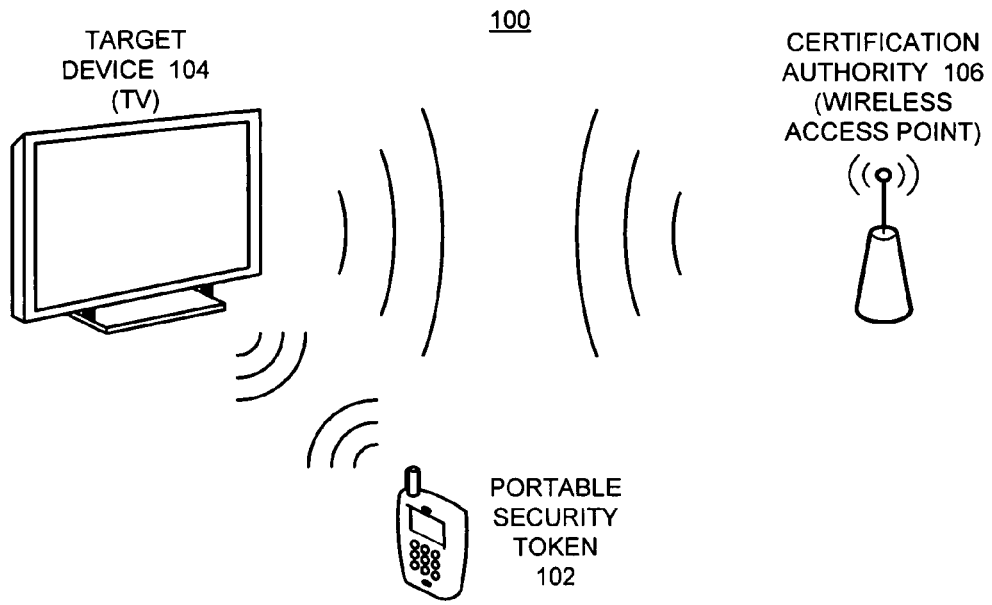
FIG. 1 illustrates a distributed computing system including a portable security token, a target device and a certification authority (CA) in accordance with an embodiment of the present invention.

FIG. 1 illustrates a distributed computing system 100 including a portable security token 102, a target device 104 and a certification authority (CA) 106 in accordance with an embodiment of the present invention.

Target device 104 can include any computational device or appliance that can make use of a credential. In the embodiment of the invention illustrated in FIG. 1, target device 104 is a television set with computational capabilities that is able to communicate across a wireless network.

CA 106 can include any computational device that can perform certification authority functions. In the embodiment of the invention illustrated in FIG. 1, CA 106 is located within an intelligent wireless access point, which contains a CA and an authentication server, that respectively issue and check certificates for devices on a wireless network that the wireless access point provides. The television set (illustrated as target device 104) exemplifies a device that can be added to such a network.

Portable security token 102 can include any type of portable device that can communicate with network devices through a location-limited communication channel. For example, portable security token 102 can include, but is not limited to, a cell phone, a smart card, a personal digital assistant (PDA), a laptop computer, or a hand-held remote control device. Note that portable security token 102 may have limited computational capabilities, and consequently, may not be capable of performing public-key operations. Furthermore, portable security token 102 does not have to be able to simultaneously communicate with the CA (or anyone else) beyond the LLC-based communication with the target device in order to be able to enroll the target device.

Interactions between portable security token 102, target device 104 and CA 106 are described in more detail below with reference to FIGS. 2-4.

Initialization Operations Between Portable Security Token and CA

Figure 2:
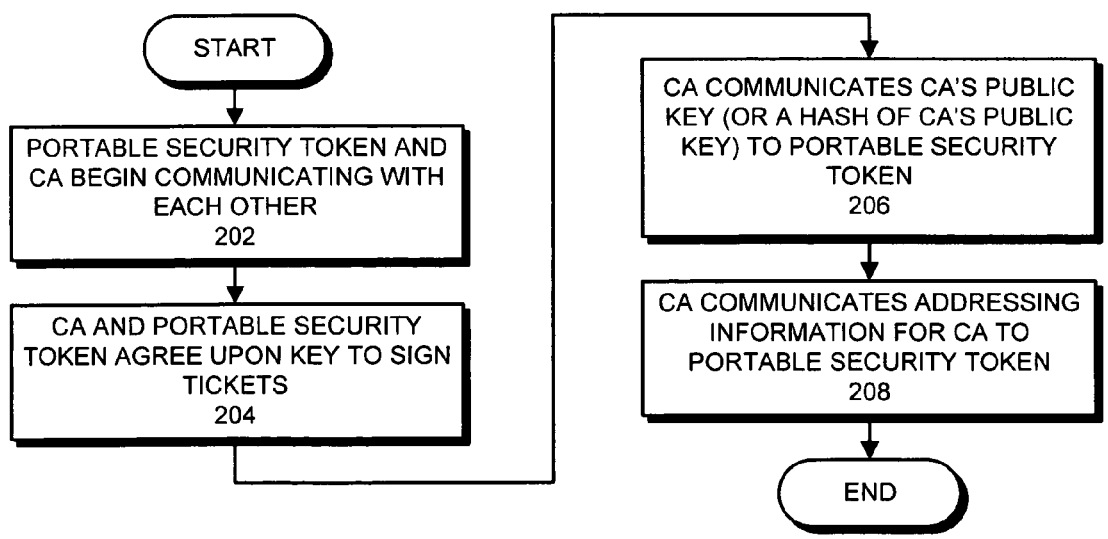
FIG. 2 presents a flow chart illustrating how the portable security token initially interacts with the CA in accordance with an embodiment of the present invention.

FIG. 2 presents a flow chart illustrating how portable security token 102 initially interacts with the CA in accordance with an embodiment of the present invention. First, portable security token 102 and CA 106 begin communicating with each other (step 202). This communication can take place in a number of ways. For example, portable security token 102 and CA 106 can be brought into close proximity to each other so that portable security token 102 and CA 106 can communicate through a location-limited communication channel. Alternatively, portable security token 102 and CA 106 can communicate through a direct wired connection, or portable security token 102 can communicate with CA 106 though a public network.

Portable security token 102 and CA 106 can then (optionally) authenticate each other before proceeding. Next, CA 106 and portable security token 102 agree upon a key that portable security token 102 will subsequently use to sign tickets for network devices (step 204). In one embodiment of the present invention, this key is a secret symmetric key that is known only by CA 106 and portable security token 102. In another embodiment, portable security token 102 receives a digital certificate issued by CA 106, and portable security token 102 uses its corresponding private key, which is associated with this digital certificate, to sign tickets.

This could also just be a public key (uncertified) of the portable security token that the CA simply remembers, rather than certifying it. If the key used is a shared secret key, the CA must remember it. If it is a public key, either the CA must remember the entire key (with or without its surrounding certificate, and not just a hash of it), or the CA must receive a copy of the entire key with the collection of ticket and other stuff it must verify, and at the same time must have a way of validating the key as belonging to a legitimate token that it allows to post requests. This latter validation can be done by having the CA remember the hash of the token's public key, or by having the CA issue a certificate as described above, in which case the entire certificate must be presented by the target along with the signed ticket. If the LLC is low-bandwidth, the best option is probably just to have the CA remember the token's public key (marked as one that can sign tickets), but the certificate route works just fine as long as it's passed around properly (the CA could remember the certificate, but that's isomorphic to remembering the public key, and the certificate in that case plays only the role of the "mark" that this is a public key that can sign tickets).

CA 106 also communicates its public key (or a hash of its public key) to portable security token 102 (step 206), as well as addressing information (such as an Internet Protocol (IP) address of the CA) (step 208). Portable security token 102 subsequently communicates CA 106's public key and addressing information to network devices to enable the network devices to communicate with and authenticate CA 106.

At this point, portable security token 102 is ready to issue tickets.

How Portable Security Token Issues a Ticket to a Target Device

Figure 3:
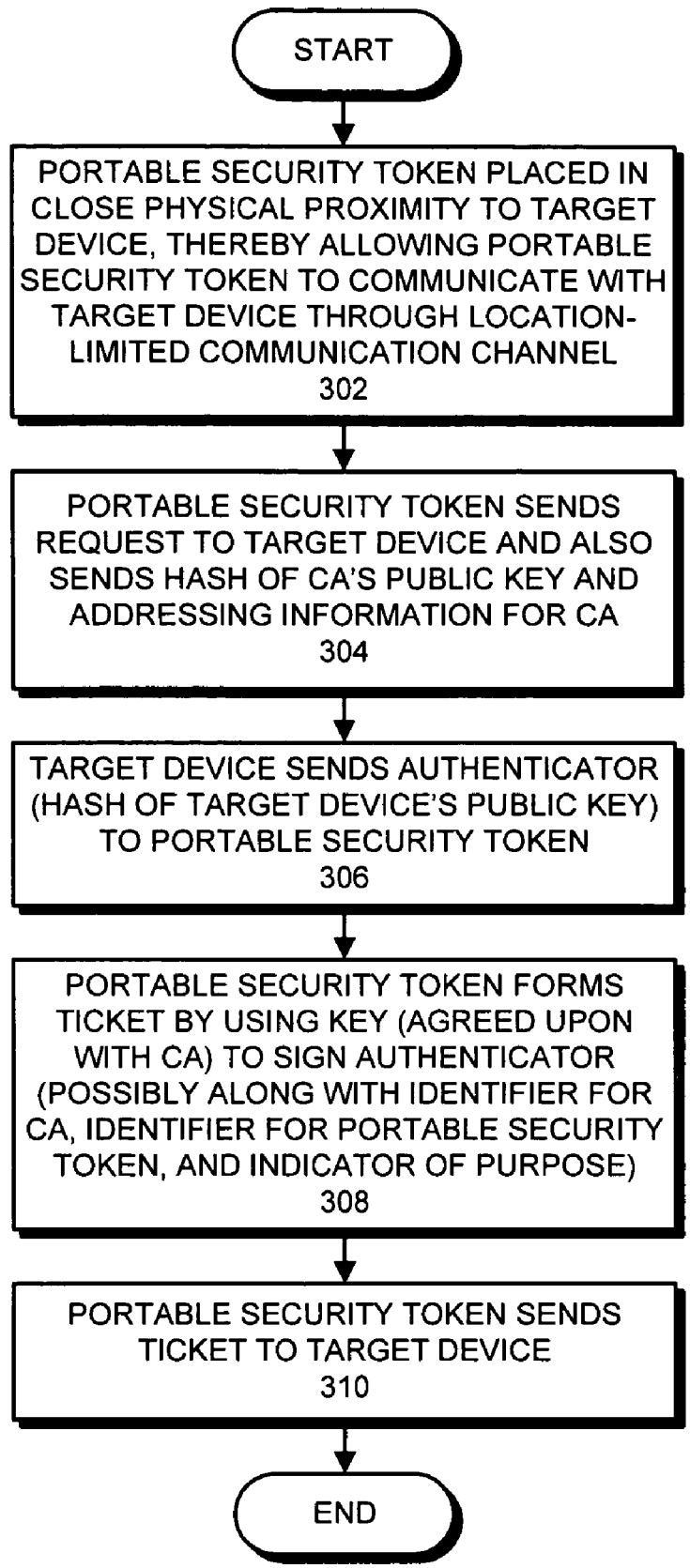
FIG. 3 presents a flow chart illustrating how the target device obtains a ticket by interacting with the portable security token in accordance with an embodiment of the present invention.

FIG. 3 presents a flow chart illustrating how portable security token 102 issues a ticket to target device 104 in accordance with an embodiment of the present invention. Portable security token 102 is initially placed in close physical proximity to target device 104 (step 302). This enables portable security token 102 to communicate with target device 104 through a location-limited communication channel.

This location-limited communication channel can include: a communication channel that uses visible or invisible electromagnetic radiation communication, such as an infrared communication channel; a communication channel through a short run of wires; an audio communication channel (either audible or inaudible); a physical electrical contact; a short range RF channel; a near-field signaling channel; and a communication channel that operates by passing information from one device to another device through a physical computer-readable media, such as a removable disk, a USB storage device, a flash memory pen, or other tangible data carrier.

This location-limited communication channel ideally has the "demonstrative identification property," which means that human operators are aware of which devices are communicating with each other over the channel, which enables the human operators to easily detect when an attack is being made on the channel.

This location-limited communication channel also ideally has the "authenticity property," which means that it is impossible or difficult for an attacker to transmit over the channel or tamper with messages sent over the channel without being detected by the legitimate parties to the communication. Note that it is not necessary for the channel to provide secrecy. Hence, an attacker can monitor the transmissions on the channel, so long as the attacker cannot transmit on the channel without detection.

Note that because of the location-limited nature of the channel, it is difficult for an attacker to monitor the channel, let alone transmit on the channel without detection. Furthermore, detection only requires that the human participants know the number of the participants (devices) who are communicating over the channel.

In one embodiment of the present invention, portable security token 102 functions like an infrared television remote control. In this embodiment, a human operator located in close proximity to target device 104 points portable security token 102 at target device 104 and presses a button to initiate communications between portable security token 102 and target device 104.

During these communications, portable security token 102 sends an initial request to target device 104 (step 304). This initial request (or possibly a subsequent message) can include CA 106's public key (or a hash of CA 106's public key) and addressing information for CA 106 to enable target device 104 to subsequently communicate with and authenticate CA 106.

In response to this request, target device 104 returns an authenticator to portable security token 102 (step 306). This authenticator is a cryptographic token that can be used in a subsequent protocol between target device 104 and the CA 106 to prove that the cryptographic token originated from target device 104. For example, the authenticator can be, target device 104's public key, a hash of target device 104's public key, or a hash of a secret known only by target device 104.

Next, portable security token 102 forms a ticket by digitally signing authenticator (step 308). Note that in addition to the authenticator, the ticket can also include: an identifier for CA 106, an identifier for portable security token 102, and an indicator of the purpose of the ticket. Moreover, this digital signing process involves using the key that was previously agreed upon between portable security token 102 and CA 106.

Finally, after the ticket is formed and signed, portable security token 102 sends the ticket to target device 104 (step 310). Target device 104 can subsequently present the ticket to CA 106 to prove that target device 104 is authorized to receive a credential from CA 106. This process is described in more detail below.

How Target Device Obtains Credential from CA

Figure 4:
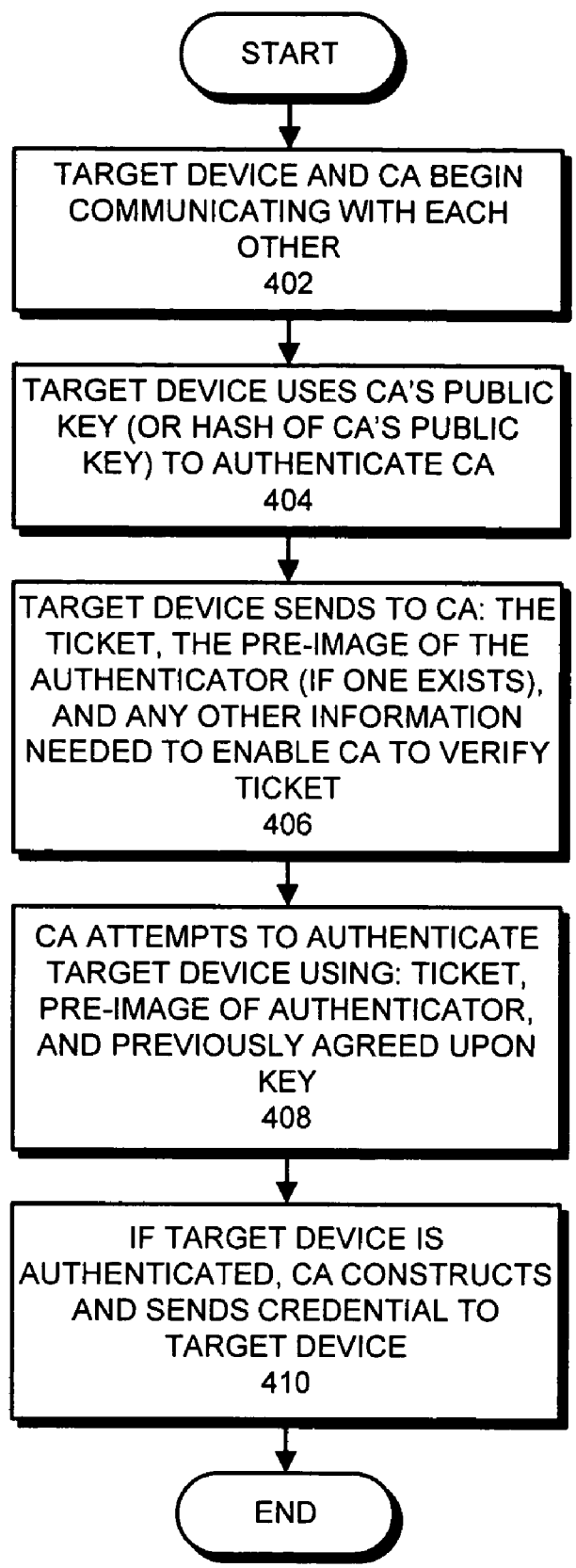
FIG. 4 presents a flow chart illustrating how the target device subsequently interacts with the CA to receive a credential in accordance with an embodiment of the present invention.

FIG. 4 presents a flow chart illustrating how the target device 104 subsequently interacts with CA 106 to receive a credential in accordance with an embodiment of the present invention. At the start of this process, target device 104 and CA 106 begin communicating with each other through any one of a number of communication channels (step 402). For example, target device 104 can use the addressing information for CA 106 (obtained from portable security token 102) to begin communicating with CA 106 though a network.

Next, target device 104 uses CA 106's public key (or a hash of CA 106's public key) previously obtained from portable security token 102 to authenticate CA 106 (step 404). This can be accomplished using well-known authentication techniques. For example, target device 104 can cause CA 106 to sign some piece of information with CA 106's private key. Target device 104 can then use CA 106's public key to verify that the information was signed by CA 106's private key. Note that if target device 104 only possesses the hash of CA 106's public key, target device 104 must first obtain CA 106's public key from CA 106.

Once target device 104 has authenticated CA 106, target device 104 sends the ticket, along with other information needed to verify the ticket, to CA 106 (step 406). This other information needed to verify the ticket can include, the pre-image of the authenticator (if one exists). For example, if the authenticator is a hash of target device 104's public key, the pre-image would be target device 104's public key in un-hashed form.

Similarly, if the authenticator is a hash, H(S), of a secret, S, known only to target device 104, the pre-image would be the secret, S. In this case, the secret, S, is ideally sent to the CA through a secure encrypted tunnel, such as an SSL connection, which is established between target device 104 and CA 106.

Next, CA 106 attempts to authenticate target device 104 using the ticket, the pre-image of the authenticator (if one exists) and the previously agreed upon key (step 408). This involves verifying the ticket was signed with the previously agreed upon key and also verifying that the pre-image of the authenticator (if one exists) is consistent with the authenticator.

If target device 104 is successfully authenticated, CA 106 constructs and sends a credential to target device 104 (step 410). In one embodiment of the present invention, this credential is a digital certificate for target device 104's public key, which is signed by CA 106 (using its private key). Note that this certificate can include restrictions on its usage. For example, the digital certificate can be restricted so that it only enables target device 104 to join a secure network.

Note that in other embodiments of the present invention, other credentials can be used, such as a shared secret (that must be given to the target over a secure tunnel), specific types of certificates (X.509, SPKI, WTLS, etc), or other types of public key-based cryptographic credentials, from digital cash to anonymous credentials, to more tickets (Kerberos tickets, tickets like these for yet other credentials, movies, etc).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a portable security token to facilitate public key certification for a target device in a network, comprising:

bringing the portable security token in close physical proximity to the target device, wherein the portable security token is a portable device that communicates with network devices through a location-limited communication channel, and wherein the portable security token has previously agreed upon a key with a certification authority (CA), wherein the location-limited channel has a demonstrative identification property and an authenticity property;

receiving an authenticator for the target device at the portable security token through the location-limited communication channel;

forming a ticket by digitally signing the authenticator, wherein the signing involves using the key that was previously agreed upon by the portable security token and the CA; and sending the ticket to the target device, whereby the target device subsequently presents the ticket to the CA to prove that the target device is authorized to receive a credential from the CA;

wherein the portable security token, the target device, and the CA are different from one another.

2. The method of claim 1, wherein the authenticator includes:

a hash of the target device's public key;

a hash of a secret known only by the target device;

the target device's public key; or a hash of a certificate or a piece of data belonging to the device already.

3. The method of claim 1, wherein the key previously agreed upon by the portable security token and the CA is:

a secret symmetric key known by only the portable security token and the CA; or a private key belonging to the portable security token.

4. The method of claim 1, wherein the credential is a public key certificate for the target device, which is signed by the CA.

5. The method of claim 1, wherein before the portable security token communicates with the target device, the portable security token initially communicates with the CA, and during this initial communication:

the CA and portable security token agree upon the key which is used to sign the ticket;

the CA communicates a hash of the CA's public key to the portable security token; and the CA communicates addressing information for the CA to portable security token.

6. The method of claim 1, wherein prior to receiving the authenticator at the portable security token, the portable security token sends a request for the authenticator to the target device.

7. The method of claim 1, wherein the portable security token additionally sends to the target device:
addressing information for the CA; and
the CA's public key (or a hash of the CA's public key);
thereby enabling the target device to communicate with and authenticate the CA.

8. The method of claim 1, wherein in addition to the authenticator, the ticket also includes:
an identifier for the CA;
an identifier for the portable security token; and
an indicator of the purpose for the ticket.

9. The method of claim 1, wherein after the target device receives the ticket, the target device subsequently communicates with the CA, and in doing so first authenticates the CA using the CA's public key (or the hash of the CA's public key) provided to the target device by the portable security token.

10. The method of claim 9, wherein after the target device authenticates the CA, the target device sends the following to the CA:
the ticket;
a pre-image of the authenticator (if one exists); and
any other information that the CA needs to verify the ticket.

11. The method of claim 10, wherein if the pre-image of the authenticator is a secret known only by the target device, the pre-image is sent to the CA through a secure tunnel.

12. The method of claim 10,
wherein the CA subsequently attempts to authenticate the target device using the ticket, the pre-image of the authenticator (if one exists), and the key previously agreed upon by the portable security token and the CA;
wherein if the target device is authenticated, the CA sends the credential to the target device.

13. The method of claim 1, wherein the portable security token is hardware-constrained and therefore has limited computational capabilities.

14. A method for using a portable security token to facilitate public key certification for a target device in a network, comprising:
receiving a request at the target device from the portable security token through a location-limited communication channel, wherein the portable security token is a portable device that communicates with network devices through the location-limited communication channel, and wherein the portable security token has previously agreed upon a key with a certification authority (CA), wherein the location-limited channel has a demonstrative identification property and an authenticity property;
in response to the request, sending an authenticator for the target device to the portable security token through the location-limited communication channel; and
receiving a ticket from the portable security token, the portable security token having formed the ticket by digitally signing the authenticator, wherein the signing involves using the key that was previously agreed upon by the portable security token and the CA;
whereby the target device subsequently presents the ticket to the CA to prove that the target device is authorized to receive a credential from the CA;
wherein the portable security token, the target device, and the CA are different from one another.

15. A computer-readable storage medium storing instructions that when executed by a computer cause the computer to perform a method for using a portable security token to facilitate public key certification for a target device in a network, the method comprising:
receiving an authenticator for the target device at the portable security token through a location-limited communication channel, wherein the portable security token is a portable device that communicates with network devices through the location-limited communication channel, and wherein the portable security token has previously agreed upon a key with a certification authority (CA), wherein the location-limited channel has a demonstrative identification property and an authenticity property;
forming a ticket by digitally signing the authenticator, wherein signing involves using the key that was previously agreed upon by the portable security token and the CA; and
sending the ticket to the target device, whereby the target device subsequently presents the ticket to the CA to prove that the target device is authorized to receive a credential from the CA;
wherein the portable security token, the target device, and the CA are different from one another.

16. The computer-readable storage medium of claim 15, wherein the authenticator includes:
a hash of the target device's public key;
a hash of a secret known only by the target device;
the target device's public key; or
a hash of a certificate or a piece of data belonging to the device already.

17. The computer-readable storage medium of claim 15, wherein the key previously agreed upon by the portable security token and the CA is:
a secret symmetric key known by only the portable security token and the CA; or
a private key belonging to the portable security token.

18. The computer-readable storage medium of claim 15, wherein the credential is a public key certificate for the target device, which is signed by the CA.

19. The computer-readable storage medium of claim 15, wherein before the portable security token communicates with the target device, the portable security token initially communicates with the CA, and during this initial communication:
the CA and portable security token agree upon the key which is used to sign the ticket;
the CA communicates a hash of the CA's public key to the portable security token; and
the CA communicates addressing information for the CA to portable security token.

20. The computer-readable storage medium of claim 15, wherein prior to receiving the authenticator at the portable security token, the portable security token sends a request for the authenticator to the target device.

21. The computer-readable storage medium of claim 15, wherein the portable security token additionally sends to the target device:
addressing information for the CA; and
the CA's public key (or a hash of the CA's public key);
thereby enabling the target device to communicate with and authenticate the CA.

22. The computer-readable storage medium of claim 15, wherein in addition to the authenticator, the ticket also includes:
   an identifier for the CA;
   an identifier for the portable security token; and
   an indicator of the purpose for the ticket.

23. The computer-readable storage medium of claim 15, wherein after the target device receives the ticket, the target device subsequently communicates with the CA, and in doing so first authenticates the CA using the CA's public key (or the hash of the CA's public key) provided to the target device by the portable security token.

24. The computer-readable storage medium of claim 23, wherein after the target device authenticates the CA, the target device sends the following to the CA:
   the ticket;
   a pre-image of the authenticator (if one exists); and
   any other information that the CA needs to verify the ticket.

25. The computer-readable storage medium of claim 24, wherein if the pre-image of the authenticator is a secret known only by the target device, the pre-image is sent to the CA through a secure tunnel.

26. The computer-readable storage medium of claim 24, wherein the CA subsequently attempts to authenticate the target device using the ticket, the pre-image of the authenticator (if one exists), and the key previously agreed upon by the portable security token and the CA;
   wherein if the target device is authenticated, the CA sends the credential to the target device.

27. The computer-readable storage medium of claim 15, wherein the portable security token is hardware-constrained and therefore has limited computational capabilities.

28. A computer-readable storage medium storing instructions that when executed by a computer cause the computer to perform a method for using a portable security token to facilitate public key certification for a target device in a network, the method comprising:
   receiving a request at the target device from the portable security token through a location-limited communication channel, wherein the portable security token is a portable device that communicates with network devices through the location-limited communication channel, and wherein the portable security token has previously agreed upon a key with a certification authority (CA), wherein the location-limited channel has a demonstrative identification property and an authenticity property;
   in response to the request, sending an authenticator for the target device to the portable security token through the location-limited communication channel; and
   receiving a ticket from the portable security token, the portable security token having formed the ticket by digitally signing the authenticator, wherein the signing involves using the key that was previously agreed upon by the portable security token and the CA;
   whereby the target device subsequently presents the ticket to the CA to prove that the target device is authorized to receive a credential from the CA;
   wherein the portable security token, the target device, and the CA are different from one another.

29. An apparatus that uses a portable security token to facilitate public key certification for a target device in a network, comprising:
   the portable security token that can be located in close physical proximity to the target device, wherein the portable security token is a portable device that communicates with network devices through a location-limited communication channel, and wherein the portable security token has previously agreed upon a key with a certification authority (CA), wherein the location-limited channel has a demonstrative identification property and an authenticity property;
   a receiving mechanism within the portable security token configured to receive an authenticator for the target device through the location-limited communication channel;
   a ticket forming mechanism within the portable security token configured to form a ticket by digitally signing the authenticator, wherein the signing involves using the key that was previously agreed upon by the portable security token and the CA; and
   a sending mechanism within the portable security token configured to send the ticket to the target device, whereby the target device can subsequently present the ticket to the CA to prove that the target device is authorized to receive a credential from the CA;
   wherein the portable security token, the target device, and the CA are different from one another.

30. An apparatus that uses a portable security token to facilitate public key certification for a target device in a network, comprising:
   the target device;
   a receiving mechanism within the target device configured to receive a request from the portable security token through a location-limited communication channel, wherein the portable security token is a portable device that communicates with network devices through the location-limited communication channel, and wherein the portable security token has previously agreed upon a key with a certification authority (CA), wherein the location-limited channel has a demonstrative identification property and an authenticity property;
   a response mechanism within the target device, wherein in response to the request, the response mechanism is configured to send an authenticator for the target device to the portable security token through the location-limited communication channel; and
   wherein the receiving mechanism is additionally configured to receive a ticket from the portable security token, the portable security token having formed the ticket by digitally signing the authenticator, wherein the signing involves using the key that was previously agreed upon by the portable security token and the CA;
   whereby the target device subsequently presents the ticket to the CA to prove that the target device is authorized to receive a credential from the CA;
   wherein the portable security token, the target device, and the CA are different from one another.

* * * * *